United States Patent [19]

Hahn

[11] 3,952,773

[45] Apr. 27, 1976

[54] BREATHING GAS SUPPLY CONTROLLER

[75] Inventor: Rainer Hahn, Afrade, Germany

[73] Assignee: Dragerwerk Aktiengesellschaft, Germany

[22] Filed: Jan. 20, 1975

[21] Appl. No.: 542,511

[30] Foreign Application Priority Data

Jan. 29, 1974 Germany ............................ 2404062

[52] U.S. Cl. .............................. 137/604; 128/142.2; 137/81; 137/489; 137/DIG. 9; 251/5

[51] Int. Cl.[2] ........................................... F16K 19/00

[58] Field of Search ............... 137/DIG. 9, 489, 604, 137/606, 81; 128/142.2; 251/5, 61.1

[56] References Cited

UNITED STATES PATENTS

| | | | |
|---|---|---|---|
| 3,526,239 | 9/1970 | Oroza | 128/142.2 X |
| 3,526,241 | 9/1970 | Veit | 137/489 X |
| 3,669,142 | 6/1972 | Gerbic | 137/489 |

*Primary Examiner*—Robert G. Nilson
*Attorney, Agent, or Firm*—McGlew and Tuttle

[57] ABSTRACT

A breathing gas supply controller, comprises a housing which has a gas inlet leading to an internal gas passage which opens at the opposite end in a gas supply opening for supplying gas to a place of use, such as to aid in a person's respiration. The interior gas passage has a widened portion with an elastic valve tube in the passage which defines an annular pressure chamber around the tube which is separated from the passage. A valve member extends through the passage and it includes an intermediate annular widened portion which is engaged against the interior of the valve tube in a closed position to close off the gas passage. A control chamber, which is defined in the housing, has a first control passage communicating with the pressure chamber and a second control passage communicating with the gas passage on the downstream or gas supply end thereof. The one-way flow connection to atmosphere permits the intake of air into the gas passage for mixing with the other gas such as oxygen for flow to the person for respiration. The air flow is aspirated into the passage, preferably by a nozzle formation downstream of the elastic valve tube, or which is formed as a downstream portion of the valve tube. The control chamber includes a diaphragm actuated valve member so that when the pressure in the gas passage drops beyond a predetermined amount, the valve is opened to the first control passage in order to vent the space around the valve tube. The valve member positioned in the valve passage has an annular surface which engages against the interior wall of the valve tube when the pressure is maintained in the annular chamber around the valve tube. When the control valve opens the annular passage around the valve tube, the valve tube flexes outwardly and permits the flow of gas therethrough.

5 Claims, 2 Drawing Figures

BREATHING GAS SUPPLY CONTROLLER

FIELD AND BACKGROUND OF THE INVENTION

This invention relates in general to the construction of respiratory devices and, in particular, to a new and useful breathing gas supply controller.

DESCRIPTION OF THE PRIOR ART

The present invention is particularly directed to a breathing gas supply controller for high-altitude apparatus which include a lungs demand auxiliary valve which, upon opening, clears a venting conduit provided between the pressure side of the main valve and the control chamber of the auxiliary valve. This permits the breathing gas, which bears against the valve shutter, to pass through into the control chamber, where the valve shutter is relieved.

A lungs demand oxygen dosing device is known, which is of a similar type, and in which the oxygen supply valve is closed by a spring, and opened against the action of the spring by the inhaling aspiration movement of a control diaphragm. Since the shutter of the oxygen supply valve is of considerable weight, the spring acting thereon must also be relatively strong. Such a spring, however, is largely affected by the outer temperature. In addition, because of centrifugal accelerations, the weight of the closing assembly comprising the spring and the shutter may increase sometimes in an unexpected manner so that the lungs control operation may be disturbed or even interrupted.

In another known oxygen supply device for high altitude apparatus, the oxygen supply valve is controlled by means of a lungs demand auxiliary valve. The valve, in turn, is controlled by a diaphragm which, upon opening, clears a venting conduit which extends between a space provided before the breathing gas supply valve and accommodating the shutter member therefor and a control chamber of the control diaphragm of the auxiliary valve and through which the oxygen, under pressure, flows into the control chamber. The oxygen bears against both sides of the control diaphragm for the shutter. Due to the outflow of the oxygen, the closing side of the diaphragm is relieved and the shutter is thereby removed from its closing position. Thereupon, the oxygen pressure acts against the force of a spring retaining the shutter in its closing position and it lifts the shutter from its seat. In this case, the mechanical system comprising the spring and the shutter form an assembly which is easily and unpredictably subjected to temperature variations and centrifugal accelerations.

A further type of gas supply device for high altitude apparatus is known which includes a breathing gas supply valve which is controlled through a control diaphragm by a lungs demand auxiliary valve. This valve clears a venting conduit provided between the breathing gas supply valve and the control chamber of the diaphragm of the auxiliary valve when it is opened. The breathing gas which acts on the shutter of the breathing gas supply valve flows through this venting conduit into the control chamber when the valve is removed from its closing position. The valve shutter comprises a diaphragm of which both sides are exposed to the pressure in the breathing gas supply conduit. The exposed surface of the diaphragm which is remote from the valve seat is larger than the surface limited by the valve seat. Only the pressure difference corresponding to the unequal area of the two surfaces is available as the contact and, thereby, provides the closing pressure. In view of the only small space at disposal, the possibilities are limited. At the inhalation, with the diaphragm lifted from the valve seat, the breathing gas must flow around the valve seat and is thereby deviated through 180°. Because of these unfavorable flow conditions, the flow resistance and, consequently, the pressure drop, is high. It is not possible to achieve an automatic admixture of additional air at this location using this type of breathing gas supply device.

SUMMARY OF THE INVENTION

The present invention is directed to a breathing gas supply controller which causes only a small pressure drop in the breathing gas and which, at the same time, comprises a breathing gas conduit which permits the admixing of an additional air to the breathing gas supply controller itself. In accordance with the invention, the valve shutter of the main valve is designed as an elastic valve tube which is fixed at both ends, and the valve seat comprises a double-cone-shape member which has an annular portion which is in closed engagement with the interior walls of the valve tube and is disposed in the breathing gas conduit or passage. This advantageous design means that the breathing gas supply controller comprises a main valve having favorable flow conditions for the breathing gas which therethrough. The gas flows without deviation and with parallel flow lines between the double-cone-shape member and the inner surface of the annular valve tube. The closing effect is very favorable. The full pressure of the breathing gas supply is available as the contact pressure. The construction of the entire breathing gas supply controller is very compact. Since the breathing gas stream is not deviated, the breathing gas supply connection and the gas outlet are aligned in the same central axis. In consequence, the controller may, for example, be built directly into the mask connection for a respiratory device.

According to an advantageous development of the invention, the valve member comprises a double-cone-shape valve which includes a central widened annular portion and cone-shape portions extending in respective opposite directions therefrom. Downstream of the main valve, there is a nozzle formation so that the gas moving through the passage passes through a discharge nozzle and produces an injector effect to induce the inflow of additional air into the gas stream.

In another embodiment of the invention, the elastic valve tube may be conformable to the cone shape in the zone of the head cone of the valve member. With such a construction, a valve tube, along with the head cone of the valve member, assume the function of the discharge nozzle to produce the same injector effect and the inflow of additional air into the gas stream.

Accordingly, it is an object of the invention to provide an improved breathing gas supply controller, which comprises a lungs demand auxiliary valve which, upon opening, clears a venting conduit between the pressure side of a main valve and the control chamber of the auxiliary valve in order to permit the breathing gas which bears against a valve shutter of the valve to pass therethrough into the control chamber which regulates the pressure around an annular valve seat member or tube which surrounds the valve member having an annular portion in contact therewith and which may expand to open when the pressure around it is reduced.

A further object of the invention is to provide a breathing gas supply controller which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENTS

Figure 1:
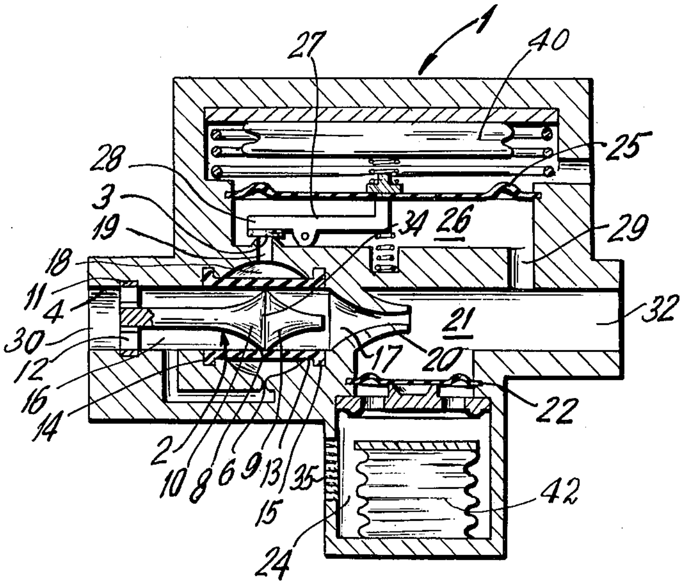
FIG. 1 is an axial sectional view of a breathing gas supply controller constructed in accordance with the invention.

Referring to the drawing in particular, the invention embodied in FIG. 1 therein, comprises a breathing gas supply controller, including a housing generally designated 1, which includes an inlet 30 to a breathing gas conduit or passage 4 which extends through the housing and is provided with a gas supply opening or discharge 32 at the opposite end of the passage.

In accordance with the invention, the flow through passage 4 is regulated by a main valve, generally designated 2, which comprises a valve member or shutter having a central annular portion 34 which engages with and closes against the interior wall of an annular diaphragm member or elastic valve tube 13. The valve member 13 includes repsective opposite ends 14 and 15 which are retained in annular recesses defined within walls of the interior of housing 1 along the gas conduit or passage 4. In the area of the elastic valve tube 13, the passage is widened to form an annular pressure cavity or space 18. A bypass bore or dosage bore 6 has one end opening into the passage 4 downstream of the annular portion 34 of the shutter valve, and an opposite end opening through a small size bore into the pressure space 18. The valve member or shutter is in the form of a double-cone 8 which includes a head cone portion 9 formed by converging walls extending toward the discharge 32, and a foot cone 10, on the opposite end, which has converging walls which extend toward the inlet 30. The valve member 8 is secured in position by an intermediate piece 11 which is secured in an annular bore of the housing. The intermediate piece 11 is provided with flow openings 12 for the passage of the breathing gas therethrough.

Gas passage 4 is further divided by coverging wall portions downstream of the main valve 2 which form a discharge nozzle 20 terminating in a low pressure space 21 immediately before the discharge opening 32. Passage 4 is divided by the intermediate piece 11 and the annular part 34 of the valve member 8 into a head cone space 17 on the end adjacent the discharge nozzle 20 and a foot cone space 16 on the end between the valve member and the intermediate piece 11.

In accordance with a feature of the invention, pressure space 18 communicates with a first control passage or valve port 19 which, in turn, communicates with a control chamber 26. Control valve means in the chamber 26 include a control diaphragm 25 which means is responsive to pressure in this chamber to move a double-armed lever 27 to cause a short-arm portion 28 thereof to open an auxiliary valve 3 to communicate the first control passage 19 and the pressure space 18 with the control chamber when the pressure in the control chamber falls beyond a predetermined amount. Control chamber 26 communicates through a second control chamber 29 with the lowe pressure area part 21 of the passage 4.

Downstream of the discharge nozzle 20, the low pressure part 21 is connected through a check valve 22 to the outside air or atmosphere surrounding the controller through an opening 35. This provides a one-way flow atmospheric connection which includes a check valve 22 permitting inflow of air from the atmosphere through the outside air communicating passage 24 and into the low-pressure part 21 for admixing with the gas flowing through the gas passage 4.

The operation of the device is as follows: The breathing gas under pressure enters into the controller housing 1 through inlet 30 and passes into the space 16 surrounding the foot cone portion 10 of the valve member 8. An additional portion of this gas also flows through the dosage passage 6 and into the pressure space 18. The pressure of this breathing gas in the pressure space 18 presses the elastic valve tube 13 against the annular central portion 34 and maintains the valve in a closed position as long as pressure space 18 remains under the same pressure.

When the user beings to inhale, an underpressure is produced in the low pressure part 21 and, thereby, also in the control chamber 26. Due to this underpressure in chamber 26, the control diaphragm 25 moves downwardly to move the double-lever 27 and to open the valve 3 and communicate the pressure space 18 through the first control passage 19 to the control chamber 26 and the low pressure side 21. This causes the venting of space 18 so that the pressure of the breathing gases causes the elastic valve tube 13 to become inflated and separated from the valve member 8 to open the main valve 2 so that the breathing gas can flow therethrough. Because of the injector effect of the discharge nozzle 20 during the passage of the gas therethrough, additional air is taken in from the atmosphere through the opening 35 in the passage 24, and it mixes with the breathing gas in the low pressure part 21 and passes outwardly through the supply opening 32 to the user.

Figure 2:
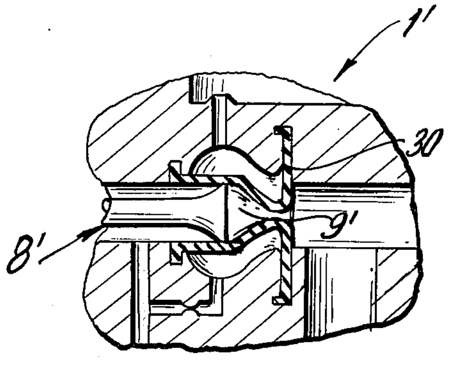
FIG. 2 is a partial sectional view, similar to FIG. 1, of another embodiment of the invention.

A slightly different construction is shown in FIG. 2 for a breathing gas supply controller having a housing, generally designated 1', and which is provided with an elastic valve tube 30 having at least a downstream end which is conformable to a head cone portion 9' of a valve member, generally designated 8'. Even during the opening of the valve member, the downstream portion of the valve tube 30 forms a discharge nozzle configuration, similar to the nozzle 22 of the FIG. 1 embodiment which is formed as part of the housing. In this embodiment, therefore, a separate housing formation for a nozzle is not required.

The breathing gas supply controller includes two bellows 40 and 42 as shown in FIG. 1 which define evacuated diaphragm receptacles. The diaphragm receptacle 40 changes its volume as a function of flight altitude when the device is carried on an aircraft. At a predetermined height of, for example, 30,000 feet, the double lever 27 connected to the bottom of the receptacle 40 opens or closes the auxiliary knob 3. The opening above the altitude limit insures the supply of a sufficient oxygen to the user. The diaphragm 42 expands with increasing altitude and throttles the admission of external air 24 into the oxygen stream. At an altitude of, for example, 26,000 feet, the check valve 22 closes completely While specific embodiments of the invention have been shown and described in detail to illustrate the application of the principles of the invention, it will be understood that the invention may be embodied otherwise without departing from such principles.

What is claimed is:

1. A breathing gas supply controller, comprising a housing having a gas inlet, a gas supply opening spaced from said inlet, an interior gas passage extending from said inlet to said gas supply opening and having an intermediate widened portion, an elastic valve tube in said gas passage widened portion and separating said widened portion into an annular pressure chamber around the exterior of said elastic valve tube from a central flow passage portion within the interior of said valve tube, a valve member having an annular intermediate portion of maximum diameter engageable against the interior of said valve tube in a closed position closing off said gas passage, a control chamber defined in said housing having a first control passage communicating with the prressure chamber and having a second control passage communicating from said control chamber to said gas passage on the gas supply opening end of said valve member downstream of said valve member, a one-way flow atmospheric connection into said passage on the gas opening side of said valve member, and diaphragm valve control means in said control chamber and connected to said first control passage to vent said pressure chamber to permit inflation of said elastic valve tube and opening of said gas passage upon separation of the valve tube from the valve member, said valve member comprising a forward valve portion of cone-shaped configuration extending from said maximum diameter portion toward said gas supply opening, and a rear valve portion of cone-shape configuration extending in a direction toward said valve inlet, and an intermediate piece positioned in said gas passage and connected to the wall surrounding said gas passage of said housing and supporting said valve member and having openings therein for the flow of gas therethrough.

2. A breathing gas supply controller, according to claim 1, including means defining a discharge nozzle downstream of said valve member terminating in a discharge into said gas passage adjacent said gas supply opening.

3. A breathing gas supply controller, according to claim 2, wherein said means defining a gas nozzle comprises a wall formation of said housing.

4. A breathing gas supply controller, comprising a housing having a gas inlet, a gas supply opening spaced from said inlet, an interior gas passage extending from said inlet to said gas supply opening and having an intermediate widened portion, an elastic valve tube in said gas passage widened portion and separating said widened portion into an annular pressure chamber around the exterior of said elastic valve tube from a central flow passage portion within the interior of said valve tube, a valve member having an annular intermediate portion of maximum diameter engageable against the interior of said valve tube in a closed position closing off said gas passage, a control chamber defined in said housing having a first control passage communicating with the pressure chamber and having a second control passage communicating from said control chamber to said gas passage on the gas supply opening end of said valve member downstream of said valve member, a one-way flow atmospheric connection into said gas passage on the gas opening side of said valve member, and diaphragm valve control means in said control chamber and connected to said first control pasage to vent said pressure chamber to permit inflation of said elastic valve tube and opening of said gas passage upon separation of the valve tube from the valve member, said valve member including wall portions on each side of said portion of maximum dimension converging toward the downstream side and toward the upstream side, respectively, the upstream side being elongated and including a portion of substantially uniform diameter extending through said gas passage, and an intermediate piece comprising a disc-shape member having a central hub portion supporting the portion of uniform diameter of said valve member and having openings therethrough for the flow of gas around said hub portion.

5. A breathing gas supply controller, comprising a housing having a gas inlet, a gas supply opening spaced from said inlet, an interior gas passage extending from said inlet to said gas supply opening and having an intermediate widened portion, and elastic valve tube in said gas passage widened portion and separating said widened portion into an annular pressure chamber around the exterior of said elastic valve tube from a central flow passage portion within the exterior of said valve tube, a valve member having an annular intermediate portion of maximum diameter engageable against the interior of said valve tube in a closed position closing off said gas passage, a control chamber defined in said housing having a first control passage communicating with the pressure chamber and having a second control passage communicating from said control chamber to said gas passage on the gas supply opening end of said valve member downstream of said valve member, a one-way flow atmospheric connection into said gas passage on the gas opening side of said valve member, and diaphragm valve control means in said control chamber and connected to said first control passage to vent said pressure chamber to permit inflation of said elastic valve tube and opening of said gas passage upon separation of the valve tube from the valve member, including means defining a discharge nozzle downstream of said valve member terminating in a discharge into said gas passage adjacent said gas supply opening, said means defining a nozzle comprising said elastic valve tube having a downstream side with converging walls terminating in a discharge nozzle opening.

* * * * *